United States Patent
Inoue et al.

(10) Patent No.: US 10,749,162 B2
(45) Date of Patent: Aug. 18, 2020

(54) BATTERY HAVING CURRENT INTERRUPTING FUNCTION AND METHOD FOR MANUFACTURING SAME

(71) Applicant: NEC Corporation, Tokyo (JP)

(72) Inventors: Kazuhiko Inoue, Tokyo (JP); Kenichi Shimura, Tokyo (JP)

(73) Assignee: NEC Corporation, Tokyo (JP)

( * ) Notice: Subject to any disclaimer, the term of this patent is extended or adjusted under 35 U.S.C. 154(b) by 173 days.

(21) Appl. No.: 15/502,676

(22) PCT Filed: Aug. 5, 2015

(86) PCT No.: PCT/JP2015/072220
§ 371 (c)(1),
(2) Date: Feb. 8, 2017

(87) PCT Pub. No.: WO2016/027673
PCT Pub. Date: Feb. 25, 2016

(65) Prior Publication Data
US 2017/0237060 A1   Aug. 17, 2017

(30) Foreign Application Priority Data
Aug. 19, 2014   (JP) ................................ 2014-166921

(51) Int. Cl.
*H01M 2/34* (2006.01)
*H01M 2/02* (2006.01)
(Continued)

(52) U.S. Cl.
CPC ......... *H01M 2/348* (2013.01); *H01M 2/0275* (2013.01); *H01M 2/06* (2013.01);
(Continued)

(58) Field of Classification Search
CPC ......... H01M 10/4235; H01M 2200/10; H01M 2200/20; H01M 2220/20; H01M 2/0275;
(Continued)

(56) References Cited

U.S. PATENT DOCUMENTS 6,175,213 B1 * 1/2001 Centa .................. H01M 2/1061
320/112
6,187,472 B1   2/2001 Shiota et al.
(Continued)

FOREIGN PATENT DOCUMENTS

EP   0862230 A2   9/1998
EP   2602840 A2   6/2013
(Continued)

OTHER PUBLICATIONS

Morisako et al., Battery Case Having Safety Valve, Aug. 20, 1998, machine translation from Japan Platform for Patent Information. (Year: 1998).*

(Continued)

*Primary Examiner* — Adam A Arciero
(74) *Attorney, Agent, or Firm* — Wilmer Cutler Pickering Hale and Dorr LLP

(57) ABSTRACT

With a battery using a flexible outer package, electric current is reliably interrupted when the temperature is increased due to the occurrence of abnormality, thereby preventing excessive heat generation. A battery 1 includes a battery element 10, a pair of first terminals 11 that are electrically connected to the battery element 10, a flexible outer package 13, and a second terminal 12. The outer package 13 is partitioned into a first chamber 13a in which the battery element 10 is sealed and a second chamber 13b which is adjacent to the first chamber 13a. The second terminal 12 is led out from the second chamber 13b to the outside of the outer package 13 so that one first terminal 11 is made electrically connectable (Continued)

to an external wiring through the second chamber 13b. A gas generation material 14 which generates a gas at a predetermined temperature or higher is sealed in the second chamber 13b.

18 Claims, 12 Drawing Sheets

(51) Int. Cl.
*H01M 2/06* (2006.01)
*H01M 2/08* (2006.01)
*H01M 2/30* (2006.01)
*H01M 10/42* (2006.01)
*B60L 50/64* (2019.01)

(52) U.S. Cl.
CPC ............... *H01M 2/08* (2013.01); *H01M 2/30* (2013.01); *H01M 2/345* (2013.01); *H01M 10/4235* (2013.01); *B60L 50/64* (2019.02); *H01M 2200/10* (2013.01); *H01M 2200/20* (2013.01); *H01M 2220/20* (2013.01)

(58) Field of Classification Search
CPC ............ H01M 2/06; H01M 2/08; H01M 2/30; H01M 2/345; H01M 2/348; B60L 11/1879
See application file for complete search history.

(56) References Cited

U.S. PATENT DOCUMENTS

| | | | | |
|---|---|---|---|---|
| 2002/0018926 A1* | 2/2002 | Shiga | ...................... | H01M 4/13 429/61 |
| 2010/0183910 A1* | 7/2010 | Nishino | .............. | H01M 2/1055 429/163 |
| 2012/0040235 A1* | 2/2012 | Cho | .................... | H01M 2/0207 429/156 |
| 2014/0178724 A1* | 6/2014 | Saruwatari | ............ | H01M 4/485 429/82 |

FOREIGN PATENT DOCUMENTS

| | | |
|---|---|---|
| JP | H05-242913 A | 9/1993 |
| JP | H10-294097 A | 11/1998 |
| JP | 2000-067846 A | 3/2000 |
| JP | 2000-277064 A | 10/2000 |
| JP | 2001-229893 A | 8/2001 |
| JP | 2010-157451 A | 7/2010 |
| JP | 2010-527134 A | 8/2010 |
| JP | 2011-519124 A | 6/2011 |
| JP | 2013-535791 A | 9/2013 |
| JP | 2013-206734 A | 10/2013 |
| WO | WO-2013/031981 A1 | 3/2013 |

OTHER PUBLICATIONS

International Search Report corresponding to PCT/JP2015/072220, 2 pages, dated Oct. 20, 2015.

Japanese Notice of Reasons for Refusal issued in Japanese Patent Application No. 2016-543900, dated Aug. 27, 2019, 6 pages.

\* cited by examiner

BATTERY HAVING CURRENT INTERRUPTING FUNCTION AND METHOD FOR MANUFACTURING SAME

CROSS-REFERENCE TO RELATED APPLICATIONS

This application is a national stage application of International Application No. PCT/JP2015/072220 entitled "BATTERY HAVING CURRENT INTERRUPTING FUNCTION AND METHOD FOR MANUFACTURING SAME," filed on Aug. 5, 2015, which claims the benefit of the priority of Japanese Patent Application No. 2014-166921 filed on Aug. 19, 2014, the disclosures of each of which are hereby incorporated by reference in their entirety.

TECHNICAL FIELD

The present invention relates to a battery having a function of interrupting current when abnormality occurs and thereby preventing excessive heat generation.

BACKGROUND ART

Nonaqueous electrolyte secondary batteries such as lithium ion secondary batteries have various advantages like high energy density, small self-discharge and excellent long-term reliability, and are already commercialized by virtue of such advantages as batteries for notebook personal computers or cellular phones. However, in recent years, since electronic devices are equipped with higher functions and the use of electronic devices for electric cars is advancing, the development of lithium ion secondary batteries having higher energy density is underway.

On the other hand, the higher the energy capacity or the energy density of a battery becomes, the more likely the battery temperature is to rise when a short circuit occurs due to an impact from outside or a circuit failure or when the battery is overcharged. At this time, oxygen desorbing reaction of an active material or thermal decomposition reaction of an electrolyte occurs, which causes the battery to further generate heat.

Conventionally, various interrupting mechanisms have been disclosed as solutions to heat generation of batteries. For example, Patent Literature 1 discloses a battery structured such that a thin plate is provided inside a housing, which is deformed when an inner pressure increases and part of an electrode lead is welded to the thin plate. In such a configuration, deformation of the thin plate caused by an increase in the inner pressure causes the electrode lead to be cut and current is thereby interrupted. Patent Literature 2 discloses that a compound which is oxidized at a predetermined voltage or higher is added to an electrolyte. By heat generation at the time of oxidation, this compound induces decomposition of components of the electrolyte or vaporization, causes the inner pressure of the battery to increase, and the pressure increase activates safety means to effectively function. Patent Literature 3 discloses an interrupting mechanism with a heat fuse incorporated into a current output conductor. Patent Literature 4 discloses an interrupting mechanism having a structure in which a battery case that houses an electrode assembly is made expandable in a direction in which an electrode lead is led out, the battery case expands when an inner pressure of the battery increases and a joint between the electrode lead and an electrode tab is separated.

Patent Literature 5 discloses a battery having a structure in which a battery case that houses an electrode assembly is formed of a bag of a heat sealable film and an interior of the bag is divided into a main chamber that houses the electrode assembly and a sub-chamber adjacent to the main chamber, and through which an electrode lead passes. A partition sealing section that partitions the main chamber from the sub-chamber includes a weak sealing section. Inside the sub-chamber, the electrode lead is provided with an interrupting mechanism whereby the electrode lead is disconnected when an inner pressure increases. According to the battery in such a configuration, when an inner pressure in the main chamber increases due to the occurrence of abnormality, the weak sealing section is opened, the sub-chamber inflates and the electrode lead is thereby disconnected.

CITATION LIST

Patent Literature

Patent Literature 1: Japanese Patent Application Laid-Open No. 5-242913
Patent Literature 2: National Publication of International Patent Application No. 2010-527134
Patent Literature 3: National Publication of International Patent Application No. 2011-519124
Patent Literature 4: National Publication of International Patent Application No. 2013-535791
Patent Literature 5: Japanese Patent Application Laid-Open No. 2000-067846

SUMMARY OF INVENTION

Technical Problem

Batteries can be roughly divided into two categories. One is called a "cylindrical battery" or "square battery", an inner electrode of which is wound and the other is a "laminated battery" in which electrodes are laminated. Laminated batteries tend to be used for large batteries by making account of heat dissipation performance. From the viewpoints of weight reduction, heat dissipation performance and further cost reduction, an outer package tends to be manufactured using a laminated film whose metal foil is coated with a resin film from using a metallic case.

The interrupting mechanism described in Patent Literature 1 is intended to interrupt a circuit using deformation of the thin plate due to an inner pressure of the battery when abnormality occurs and the interrupting mechanism functions in the case of a battery having an outer package such as a metallic case which does not deform, but such a mechanism cannot be used for a laminated film. The gas generating agent described in Patent Literature 2 also presupposes an interrupting mechanism in a battery as described in Patent Literature 1 and is still not intended for batteries having a laminated film as its outer package.

Patent Literature 3 relates to a battery having a high heat dissipation laminated electrode, that is, a battery having a laminated film as its outer package, but since a thermal fuse used in a large battery through which a large current flows has a large resistance value in the fuse part, which may produce energy loss.

The structure described in Patent Literature 4 can detect a gas generated when abnormality occurs in the laminated outer package and interrupt the electric circuit, avoiding the above-described energy loss, and is therefore excellent. However, since it has a structure with the folded outer package laminate, the electrodes may be displaced by vibration and the electrodes may contact each other, resulting in ignition. Moreover, even when there is no abnormality in the battery, if an electrolyte therein slightly evaporates due to an ambient temperature or when the battery is used for a long period of time, a volatile component is generated due to electrolysis of the electrolyte. In this case, the electrodes may still be displaced by vibration. If such a phenomenon occurs when the battery is transported or when the battery is used for an automobile, not only the battery performance may deteriorate but also thermal runaway may be induced due to a short circuit in the electrodes.

The structure described in Patent Literature 5 requires the gas produced in the main chamber to destroy the weak sealed section, pass therethrough, enter the sub-chamber and cause the sub-chamber to inflate, which results in an increase in a time lag from the increase of the inner pressure in the main chamber to current interruption. For this reason, it is difficult to reliably prevent thermal runaway, and since the thermal runaway speed of the active material increases in a high energy battery in particular, it is difficult to achieve sufficient effects.

It is an object of the present invention to provide a battery using a flexible outer package that reliably interrupts current when a temperature rises due to abnormality and prevents excessive heat generation.

Solution to Problem

According to an aspect of the present invention, a battery is provided which includes a battery element, a pair of first terminals electrically connected to the battery element, an outer package made of a flexible outer package material and partitioned into a first chamber to seal the battery element and one or two second chambers adjacent to the first chamber, and one or two second terminals led out from the second chamber(s) to an outside of the outer package so that at least one of the pair of first terminals is made electrically connectable to an external wiring via the second chamber(s), in which a gas generating material that generates a gas at a predetermined temperature or higher is sealed in the second chamber(s).

Here, the first terminal and the second terminal can be arranged so that the electrical connection is interrupted when the second chamber inflates. According to this configuration, the gas generated in the second chamber(s) causes the second chamber(s) to inflate and it is thereby possible to interrupt the electrical connection between the first terminal and the second terminal.

According to another aspect of the present invention, a method for manufacturing a battery is provided which includes a step of providing a battery element assembly in which a pair of first terminals are electrically connected to a battery element, and a step of forming an outer package using a flexible outer package material in which the outer package is partitioned into a first chamber that seals the battery element and one or two second chambers adjacent to the first chamber, one or two second terminals are led out from the second chamber(s) to an outside of the outer package so that at least one of the pair of first terminals is made connectable to an external wiring via the second chamber(s), and a gas generating material that generates a gas at a predetermined temperature or higher is sealed in the second chamber(s).

In the above-described manufacturing method, the step of forming the outer package can include disposing the first terminal and the second terminal so that an electrical connection is interrupted when the second chamber expands.

Advantageous Effects of Invention

According to the present invention, the outer package is formed of the first chamber that seals the battery element and one or two second chambers adjacent to the first chamber, the gas generating material that generates a gas at a predetermined temperature or higher is sealed in the second chambers and it is thereby possible to interrupt current using the inflation of the second chamber by the generation of gas and consequently prevent an excessive temperature rise of the battery.

DESCRIPTION OF EMBODIMENTS

Figure 1A:
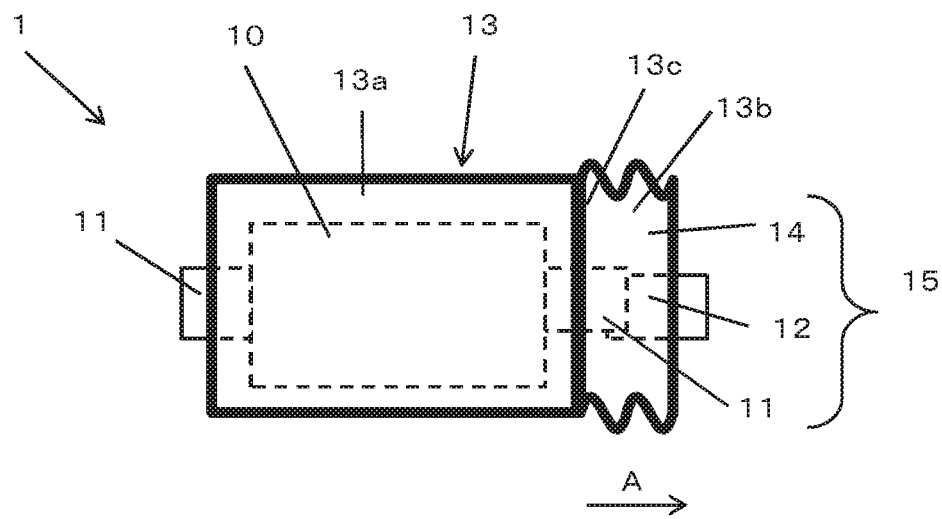
FIG. 1A is a plan view schematically illustrating a structure of a battery according to an embodiment of the present invention.
Figure 1B:
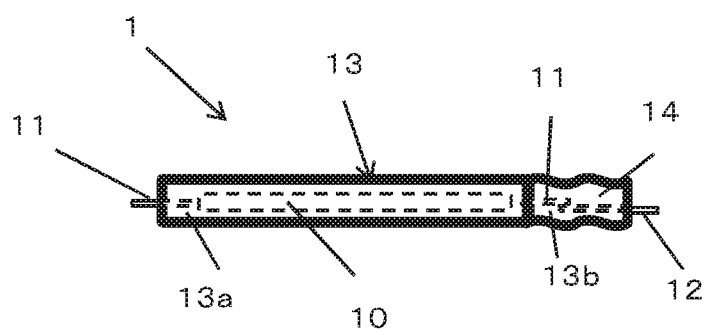
FIG. 1B is a side view schematically illustrating the structure of the battery shown in FIG. 1A.

FIGS. 1A and 1B show schematic views of a battery 1 according to an embodiment of the present invention which includes a battery element 10, an outer package 13 that seals the battery element 10 and a current interrupting mechanism 15. The battery element 10 includes a positive electrode, a negative electrode, a separator and an electrolyte. The outer package 13 is formed of a laminated film which is a weldable outer package and is partitioned into a first chamber 13a that seals the battery element 10 and a second chamber 13b adjacent to the first chamber 13a by a sealing section 13c formed through bonding by thermal welding or ultrasound welding or the like. A method for bonding the outer package is not limited to welding, but may be bonding using an adhesive. Bonding using an adhesive or combined use of bonding using an adhesive and bonding using welding can widen a range of selection of a material of the outer package.

A pair of first terminals 11 connected to a positive electrode and a negative electrode respectively extend from the battery element 10. The pair of first terminals 11 may be arranged in any given manner as long as at least one of the pair of first terminals 11 extends into the second chamber 13b and is disposed so as to be made electrically connectable to an external wiring via the second chamber 13b. In the illustrated example, the pair of first terminals 11 are arranged at both ends of the battery element 10 so that one of the pair of first terminals 11 extends into the second chamber 13b and the other is led out to the outside of the outer package 13.

When the battery element 10 is heated to a predetermined temperature or higher due to the occurrence of abnormality in the battery 1, the current interrupting mechanism 15 is configured to be activated to generate a gas, cause the second chamber 13b to inflate by the generated gas and thereby interrupt current between the battery element 10 and the external wiring. Of the pair of first terminals 11, the first terminal 11 extending into the second chamber 13b makes up part of the current interrupting mechanism 15 and the current interrupting mechanism 15 additionally includes a second terminal 12 led out from the outer package 13 and a gas generating material 14 sealed in the second chamber 13b.

The gas generating material 14 is a material that exists as a solid or liquid at normal temperature but generates a gas at a temperature higher than normal temperature and equal to or higher than a predetermined temperature at which no thermal runaway of the battery occurs, and the generation of the gas can cause the second chamber 13b to expand. Here, the "normal temperature" refers to a temperature range of 20±15° C. (that is, 5° C. to 35° C.) defined in JIS Z 8703. In the present embodiment, the second chamber 13b is configured to inflate to thereby expand in the direction (arrow A direction) in which the second terminal 12 is led out. In the present invention, the "terminal direction" means the direction in which the second terminal 12 is led out.

The second terminal 12 is a terminal connected to an external electric wiring of the battery 1, one end side of which is located in the second chamber 13b and led out to the outside of the outer package 13. Furthermore, the second terminal 12 is fixed to the outer package 13 such that the one end of the second terminal 12 is overlapping and in contact with the first terminal 11 before the second chamber 13b expands, whereas as the second chamber 13b expands, the second terminal 12 moves and separates away from the first terminal 11. Therefore, the first terminal 11 and the second terminal 12 move away from each other and the electrical connection between the battery element and the external electric wiring is interrupted. In order to make surer the contact between the first terminal 11 and the second terminal 12 before the second chamber 13b expands, before the gas generating material 14 generates a gas, the interior of the second chamber 13b is preferably kept in a vacuum state to such an extent that parts facing each other of the outer package preferably come into close contact with each other in the second chamber 13b. Such a vacuum state can be achieved by bonding the outer package to form the second chamber 13b under a reduced pressure.

Figure 2:
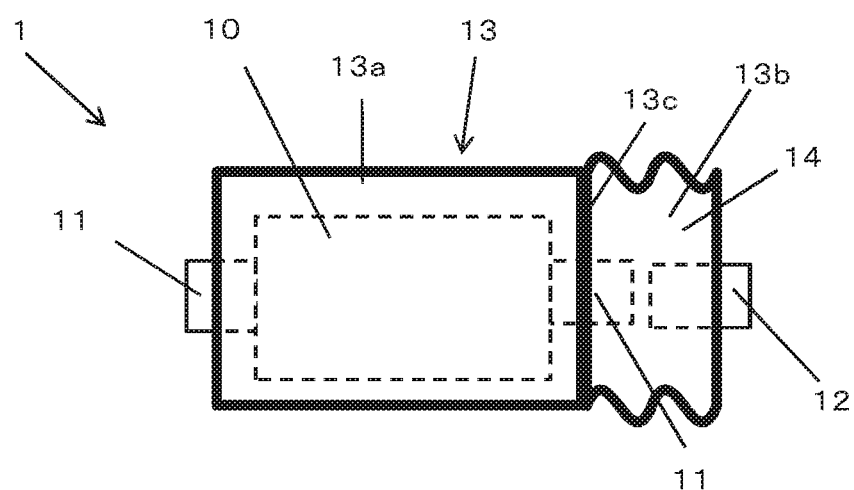
FIG. 2 is a plan view illustrating a second chamber expanding in a terminal direction in the battery shown in FIG. 1A.

When the battery element 10 generates heat due to the occurrence of abnormality, the heat is transmitted through the first terminal 11, causing a temperature rise in the second chamber 13b. When the temperature of the second chamber 13b rises, a gas is generated from the gas generating material 14 and the second chamber 13b inflates. When the second chamber 13b inflates, the second chamber 13b expands in the arrow A direction, which causes the first terminal 11 to separate from the second terminal 12 as shown in FIG. 2, thus interrupting current between the first terminal 11 and the second terminal 12. As a result, it is possible to prevent excessive heat generation in the battery 1.

Hereinafter, the aforementioned components will be described in more detail.

(Current Interrupting Mechanism)

The current interrupting mechanism 15 is not limited to the configuration shown in the aforementioned embodiment, but any given structure can be adopted as long as it is configured so that the first terminal 11 is separated from the second terminal 12 by an inflation of the second chamber 13b.

Figure 3:
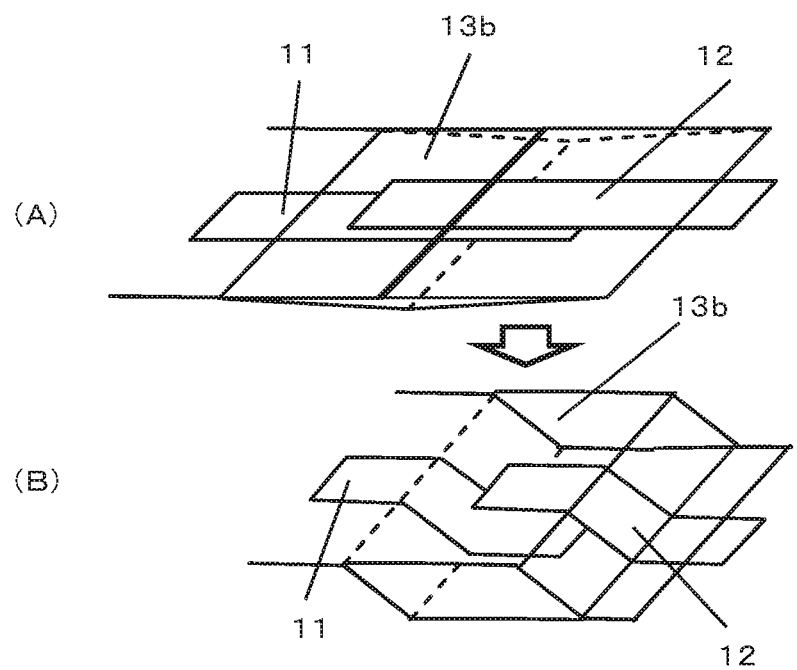
FIG. 3 is a diagram showing another embodiment of the current interrupting mechanism used in the present invention.

For example, As shown in (A) and (B) in FIG. 3, when the second chamber 13b is configured to inflate in a thickness direction of the second chamber 13b which is a direction in which surfaces of the outer package face each other, it is possible to cause the first terminal 11 to separate from the second terminal 12 in the thickness direction of the second chamber 13b. For that purpose, the first terminal 11 may be bonded to one of inner surfaces of the outer package facing each other in the second chamber 13b and the second terminal 12 may be bonded to the other inner surface. Before the inflation of the second chamber 13b due to generation of gas, the first terminal 11 and the second terminal 12 are overlapping and in contact with each other and are electrically connected. Through action of the gas generating material accompanying a temperature rise in the second chamber 13b, when a gas is generated in the second chamber 13b and the second chamber 13b inflates, the outer package material is separated in the direction in which the surfaces of the outer package facing each other in the second chamber 13b. This causes the first terminal 11 to separate from the second terminal 12, interrupting current between both terminals.

A general adhesive can be used for bonding of the first terminal 11 and the second terminal 12 to the outer package. Any type of adhesive can be used and can be selected according to the purpose as appropriate. A flexible adhesive having acrylic resin, styrene resin or butadiene resin as main agent is preferable because it has excellent followability with respect to the outer package or excellent flexibility. Furthermore, isocyanate-based urethane resin or the like is preferable because its working time is shortened. Use of epoxy resin, amide resin or the like is preferable because of its excellent heat-resistance. Conducting thermal welding using polyethylene resin or polypropylene resin is preferable because bonding can be performed in an extremely short time. In this case, use of the outer package material, an inner surface of which is coated with such resin is preferable because this facilitates bonding by thermal welding.

The material of the first terminal 11 is preferably a material which will not corrode inside the battery 1. More specifically, gold, platinum, copper, carbon, stainless steel, nickel or the like can be used for the first terminal 11 connected to a negative electrode. Aluminum or the like may be used for the first terminal 11 connected to a positive electrode. The material of the second terminal 12 is not particularly limited if it is a conductive material, and copper, aluminum or the like is preferable because it is highly conductive and inexpensive. Use of nickel, iron, stainless steel or the like is preferable because it can make a battery tab with high strength.

As another embodiment of the current interrupting mechanism 15, it is also possible to use the first terminal 11 and the second terminal 12 electrically connected by being temporarily fixed in contact with each other. The strength of the temporary fixing is deemed to be such a degree of strength that the temporary fixing of the first terminal 11 and the second terminal 12 is released due to an inflation of the second chamber 13b. It is possible to use a frictional force between the first terminal 11 and the second terminal 12 for the temporary fixing.

Figure 4:
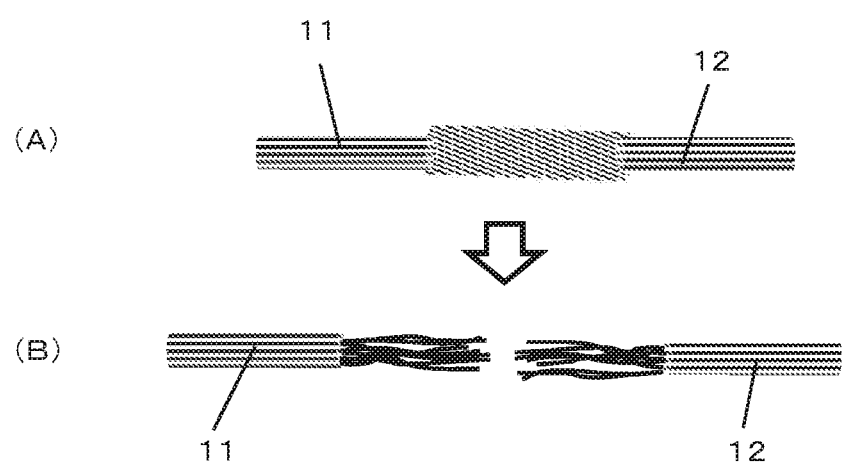
FIG. 4 is a diagram showing another embodiment of the current interrupting mechanism used in the present invention.

When the current interrupting mechanism is structured such that the first terminal 11 and the second terminal 12 are electrically connected by the temporary fixing, it is possible to make up the first terminal 11 and the second terminal 12, for example, using a bundle of a plurality of conductors as shown in (A) and (B) in FIG. 4. The bundles of conductors of the first terminal 11 and the second terminal 12 are untied at their respective ends and by causing the conductors of the first terminal 11 and the conductors of the second terminal 12 to entwine with each other, it is possible to temporarily fix both terminals while keeping them electrically connected. The second chamber is configured to be able to inflate in the direction in which the first terminal 11 and the second terminal 12 are connected and when the second chamber inflates, the second terminal 12 is pulled toward a direction in which the second terminal 12 goes away from the first terminal 11. When the second terminal 12 is pulled, the entwining of the conductors is released and current between the first terminal 11 and the second terminal 12 is interrupted.

Figure 5:
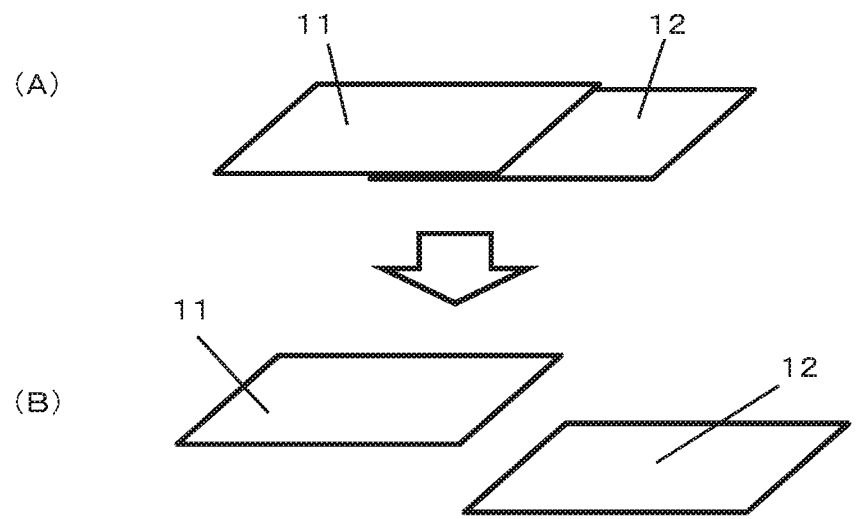
FIG. 5 is a diagram showing another embodiment of the current interrupting mechanism used in the present invention.

As shown in (A) and (B) in FIG. 5, even in a case where the first terminal 11 and the second terminal 12 are configured using tabular conductors, it is also possible to temporarily fix both terminals by forming surfaces facing each other (contact surfaces) of the first terminal 11 and the second terminal 12 into rough surfaces having many protrusions and recesses such as a "file." Since the surfaces facing each other of the first terminal 11 and the second terminal 12 have many protrusions and recesses, when both terminals have their surfaces facing each other in contact with each other, a frictional force between both surfaces makes it hard for the first terminal 11 and the second terminal 12 to laterally slide. As a result, it is possible to keep the state in which both surfaces are kept in contact with each other in a good condition until the second chamber inflates, causing the first terminal 11 to separate from the second terminal 12. Thus, when the first terminal 11 and the second terminal 12 are configured so as to keep their contact state using the frictional force resulting from many protrusions and recesses, it is possible to make surer the contact between the first terminal 11 and the second terminal 12 by keeping the interior of the second chamber in a decompressed condition (vacuum state) before the second chamber inflates.

Figure 6:
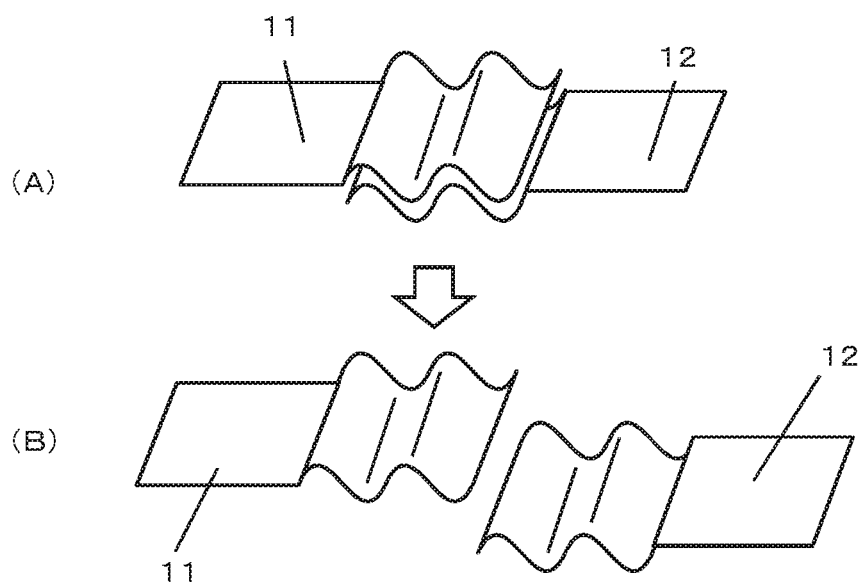
FIG. 6 is a diagram showing another embodiment of the current interrupting mechanism used in the present invention.
Figure 7:
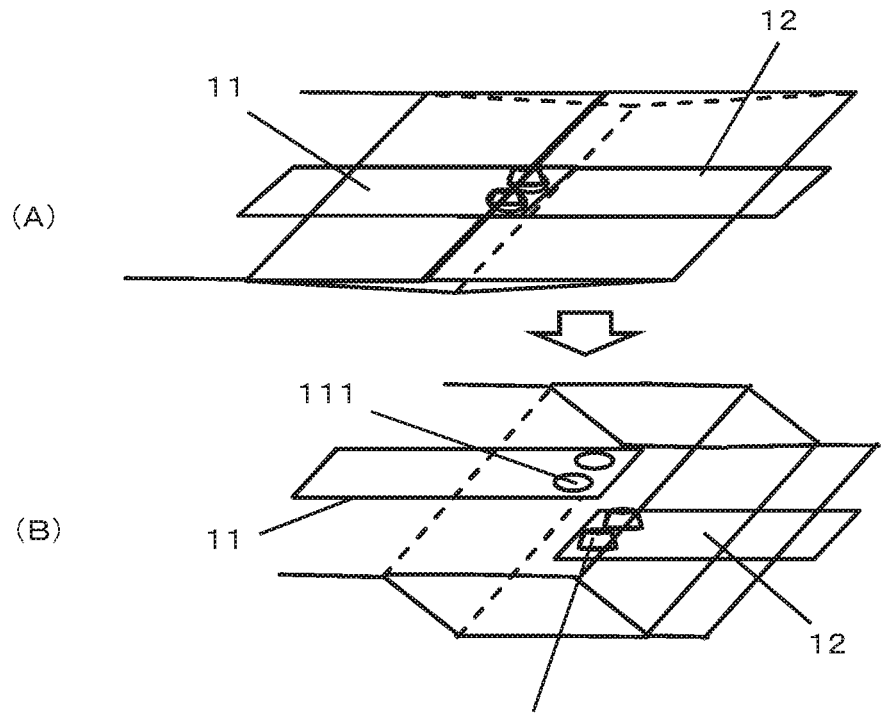
FIG. 7 is a diagram showing another embodiment of the current interrupting mechanism used in the present invention.

When the first terminal 11 and the second terminal 12 are tabular terminals, it is preferable to form protrusions and recesses so as to mesh or engage with each other. This makes it possible to increase the frictional force between the first terminal 11 and the second terminal 12 and more effectively prevent the first terminal 11 from separating from the second terminal 12 during normal operation. Examples of protrusions and recesses include bending parts of the first terminal 11 and the second terminal 12 into corrugated forms that mesh with each other as shown in (A) and (B) in FIG. 6 and providing a concave part 111 and a convex part 121 that engage with each other as shown in (A) and (B) in FIG. 7 or the like.

When the first terminal 11 and the second terminal 12 are bent into corrugated forms, the number of corrugated forms of the first terminal 11 and the second terminal 12, cycles of the corrugated forms and height difference between the corrugated forms or the like may be optionally determined. When the concave part 111 and the convex part 121 are formed in the first terminal 11 and the second terminal 12, the number of concave parts 111/convex parts 121, depths of the concave part 11, height of the convex part 121, shapes of the concave part 111/convex part 121 or the like may be optionally determined. The concave part 111 and the convex part 121 may be formed on any side of the first terminal 11 and the second terminal 12 or may be mixed. The concave part 111 may be formed as a hole as shown in (A) and (B) in FIG. 7 or may be formed as a recess. When the concave part 111 is formed as a hole, the first terminal 11 and the second terminal 12 can be coupled together more strongly. When the concave part 111 is formed as a recess, working is easier.

Figure 8:
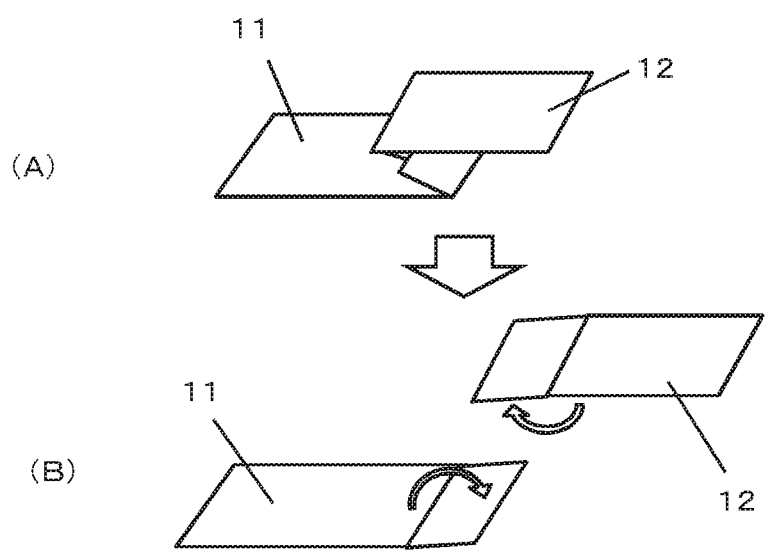
FIG. 8 is a diagram showing another embodiment of the current interrupting mechanism used in the present invention.

A structure may also be adopted as another embodiment in which the first terminal 11 and the second terminal 12 are temporarily fixed while being kept in contact with each other, as shown in (A) and (B) in FIG. 8, a distal end portion of the first terminal 11 and a distal end portion of the second terminal 12 are folded and the folded portions are caused to engage with each other like a book. When the second chamber inflates, the first terminal 11 and the second terminal 12 are pulled in a direction in which they separate away from each other, the engagement between both terminals is released and current between both terminals is interrupted. In the case of the embodiment shown in FIG. 8, it is preferable to seal the second chamber in a decompressed state and cause the first terminal 11 and the second terminal 12 to come into close contact with each other under an atmospheric pressure received by the outer package. It is thereby possible to prevent positional displacement between the first terminal 11 and the second terminal 12.

Figure 9:
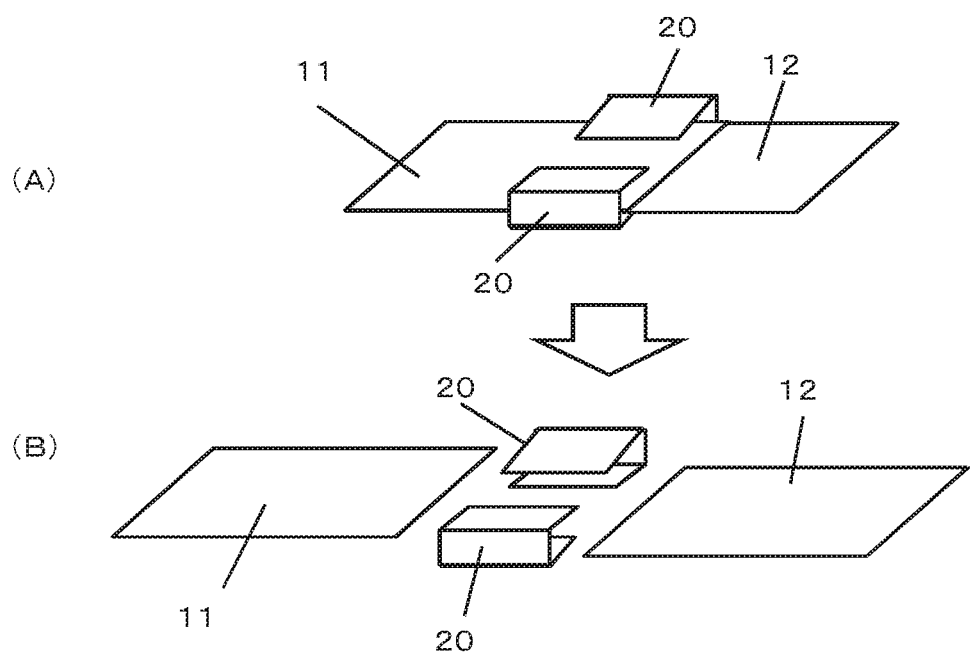
FIG. 9 is a diagram showing another embodiment of the current interrupting mechanism used in the present invention.

The current interrupting mechanism may include clips 20 that temporarily fix the first terminal 11 and the second terminal 12 as shown in (A) and (B) in FIG. 9. The clips 20 are intended to assist the first terminal 11 and the second terminal 12 which are in contact with each other in preventing deviation. Therefore, any clip may be used as the clips 20 as long as it can cause both terminals to remain in contact with each other by sandwiching the overlapping portion of the first terminal 11 and the second terminal 12. When the clips 20 are used, the clips 20 function effectively when the second chamber is configured to inflate in the direction in which the terminal is led out. The clips 20 are also applicable to a case where protrusions and recesses are formed in the first terminal 11 and the second terminal 12.

Figure 10A:
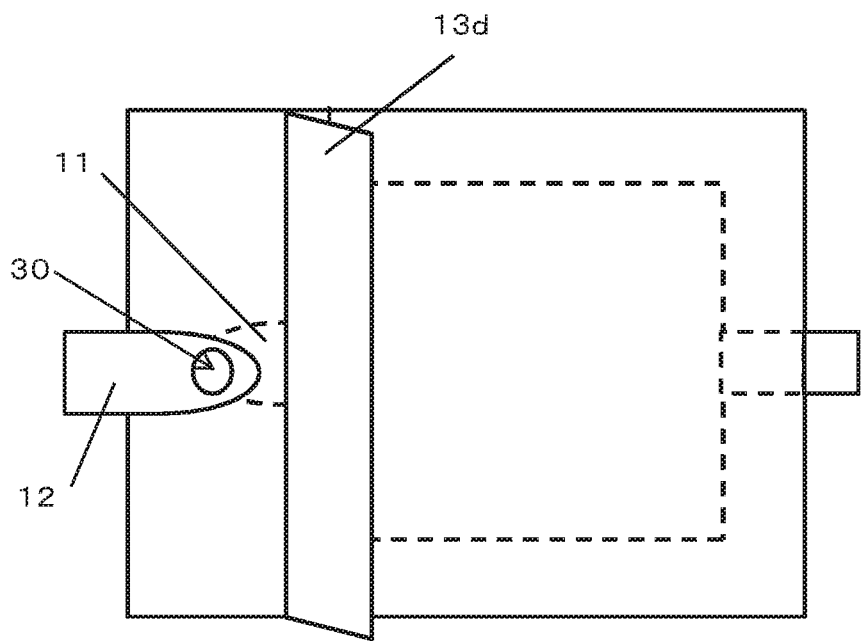
FIG. 10A is a plan view schematically illustrating another embodiment of the current interrupting mechanism used in the present invention.
Figure 10B:
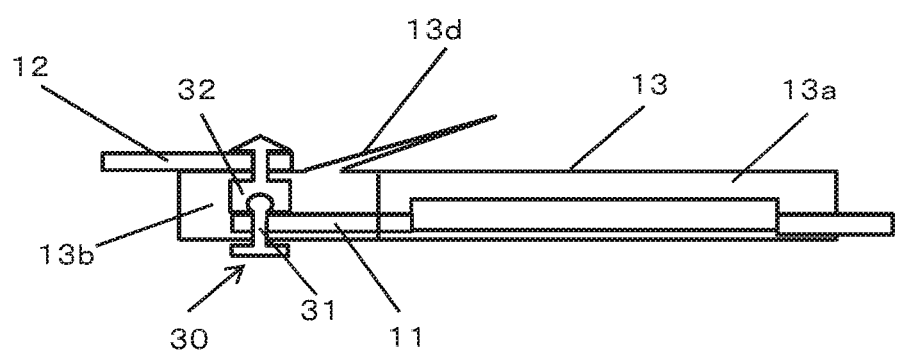
FIG. 10B is a schematic view seen from the side of the current interrupting mechanism shown in FIG. 10A.

Alternatively, as shown in FIGS. 10A and 10B, the current interrupting mechanism may include a snap 30 that temporarily fixes the first terminal 11 and the second terminal 12. The snap 30 includes a male connector 31 and a female connector 32 that engage with each other, one of which is electrically connected and fixed to the first terminal 11 and the other of which is electrically connected and fixed to the second terminal 12. The male connector 31 and the female connector 32 engage with each other before the second chamber 13b inflates, and the first terminal 11 and the second terminal 12 are electrically connected. On the other hand, when the second chamber inflates in the thickness direction of the battery, the engagement between the male connector 31 and the female connector 32 is released and current between the first terminal 11 and the second terminal 12 is interrupted.

Any structure can be used as the snap 30 as long as the two members can releasably engage with each other. The snap 30 is also called "hock" and examples of a fixing system for the male connector 31 and the female connector 32 include a magnet type and a spring type, and any fixing system can be used in the present invention. A structure for attaching the snap 30 can also be optionally selected, and in the embodiments shown in FIGS. 10A and 10B, the male connector 31 and the female connector 32 are respectively fixed to the outer package 13 by penetrating the outer package 13 at positions facing each other in the region of the second chamber 13b of the outer package 13. Since the electrical connection between the first terminal 11 and the second terminal 12 is made when the male connector 31 and the female connector 32 engage with each other, the first terminal 11 and the second terminal 12 need not be in direct contact with each other. Thus, in the present embodiment, the second terminal 12 is disposed outside the outer package 13 to reduce the number of parts interposed between the sealing section and the outer package 13. This makes it possible to favorably keep the second chamber 13b air tight. However, the second terminal 12 may also be disposed inside the second chamber 13b as in the case of the aforementioned embodiment.

Figure 10C:
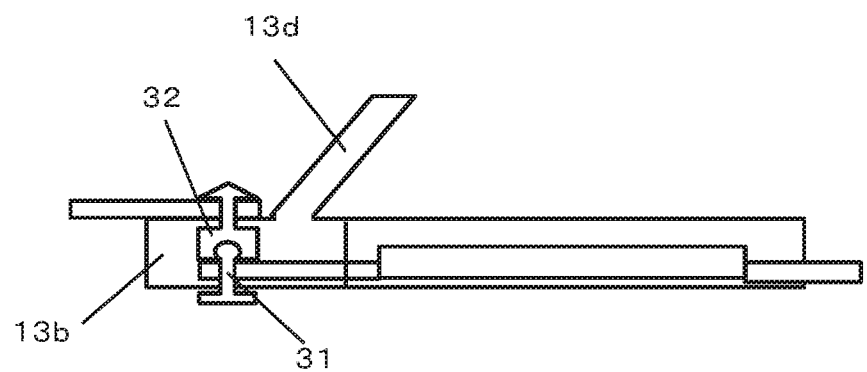
FIG. 10C is a diagram illustrating the current interrupting mechanism shown in FIG. 10B when the second chamber starts to inflate.
Figure 10D:
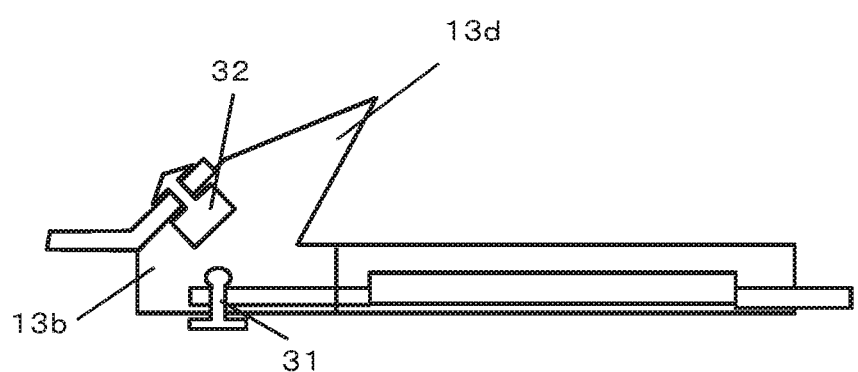
FIG. 10D is a diagram illustrating the current interrupting mechanism shown in FIG. 10C when the second chamber further inflates, and a male connector and a female connector of a snap are disengaged from each other.

In the present embodiment, the second chamber 13b includes a buffer section 13d between the region where the snap 30 is disposed and the first chamber 13a in order to facilitate disengagement between the male connector 31 and the female connector 32 when the second chamber 13b inflates. The buffer chamber 13d is a portion formed by mountain-folding the outer package 13 and is kept substantially flat before the second chamber 13b inflates. As the second chamber 13b inflates, the buffer section 13d starts to inflate as shown in FIG. 10C, the side of the second chamber 13b that includes the buffer section 13d eventually inflates a great deal, releasing the engagement between the male connector 31 and the female connector 32 as shown in FIG. 10D. Thus, since the second chamber 13b includes the buffer section 13d, it is possible to cause the second chamber 13b to inflate more and consequently more reliably interrupt current by the inflation of the second chamber 13b.

In the temporary fixing using the snap 30, a bonding force in a direction perpendicular to the engagement direction between the male connector 31 and the female connector 32 is relatively high. Therefore, the temporary fixing using the snap 30 has high resistance to vibration in an in-plane direction perpendicular to the thickness direction of the battery. In other words, even when strong vibration acts in this direction, it is possible to obtain a structure whereby the first terminal 11 and the second terminal 12 are less likely to deviate from each other. Note that since the second chamber is formed by bonding the outer package under a reduced pressure, the atmospheric pressure can complement the bonding force of the snap 30. In this case, it is possible to provide high resistance to vibration also in the direction of engagement between the male connector 31 and the female connector 32, that is, in the thickness direction of the battery.

The portion where the first terminal 11 and the second terminal 12 are overlapping and in contact with each other is coated with thermoplastic resin from outside, and it is thereby also possible to temporarily fix the first terminal 11 and the second terminal 12 while keeping both terminals in contact with each other. In this case, the thermoplastic resin used for coating for temporary fixing, that is, temporary fixing resin preferably has a melting point higher than the temperature of the battery element 10 when the battery is operating normally and equal to or lower than the temperature at which the gas generating material sealed in the second chamber is acting. Thus, the electrical connection between the first terminal 11 and the second terminal 12 is maintained while the battery is operating normally. On the other hand, when the temperature of the battery increases up to a temperature at which a gas is generated from the gas generating material due to the occurrence of abnormality, the temporary fixing resin is melted and the second chamber inflates, and it is thereby possible to interrupt current between the first terminal 11 and the second terminal 12.

The current interrupting mechanism is preferably activated for safety at an early stage, that is, at a stage at which the temperature of the battery is sufficiently lower than a thermal runaway temperature of the active material. For that purpose, the temporary fixing resin preferably has a melting point less than 200° C. In order to fill the second chamber with the gas, the melting point of the temporary fixing resin is preferably equal to or lower than the melting point of resin used as the sealing layer of the outer package. For example, when polypropylene resin is used as the sealing layer of the outer package, the melting point of the temporary fixing resin is equal to or lower than 160° C. which is the melting point of the polypropylene resin, preferably 150° C. or lower or more preferably 140° C. or lower. When ethylene resin is used as the sealing layer of the outer package, the melting point of the temporary fixing resin is equal to or lower than 120° C. which is the melting point of ethylene resin, preferably 110° C. or lower or more preferably 100° C. or lower.

On the other hand, when safety of the battery is taken into consideration, it is not desirable that the temporary fixing resin be melted at a stage at which no abnormality has occurred yet. Therefore, the melting point of the temporary fixing resin is preferably 50° C. or higher, more preferably 70° C. or higher or further preferably 80° C. or higher.

As described above, the temporary fixing resin can be selected from among resin having an appropriate melting point according to the type of resin used as the sealing layer of the outer package or temperature at which the current interrupting mechanism is activated.

Figure 11:
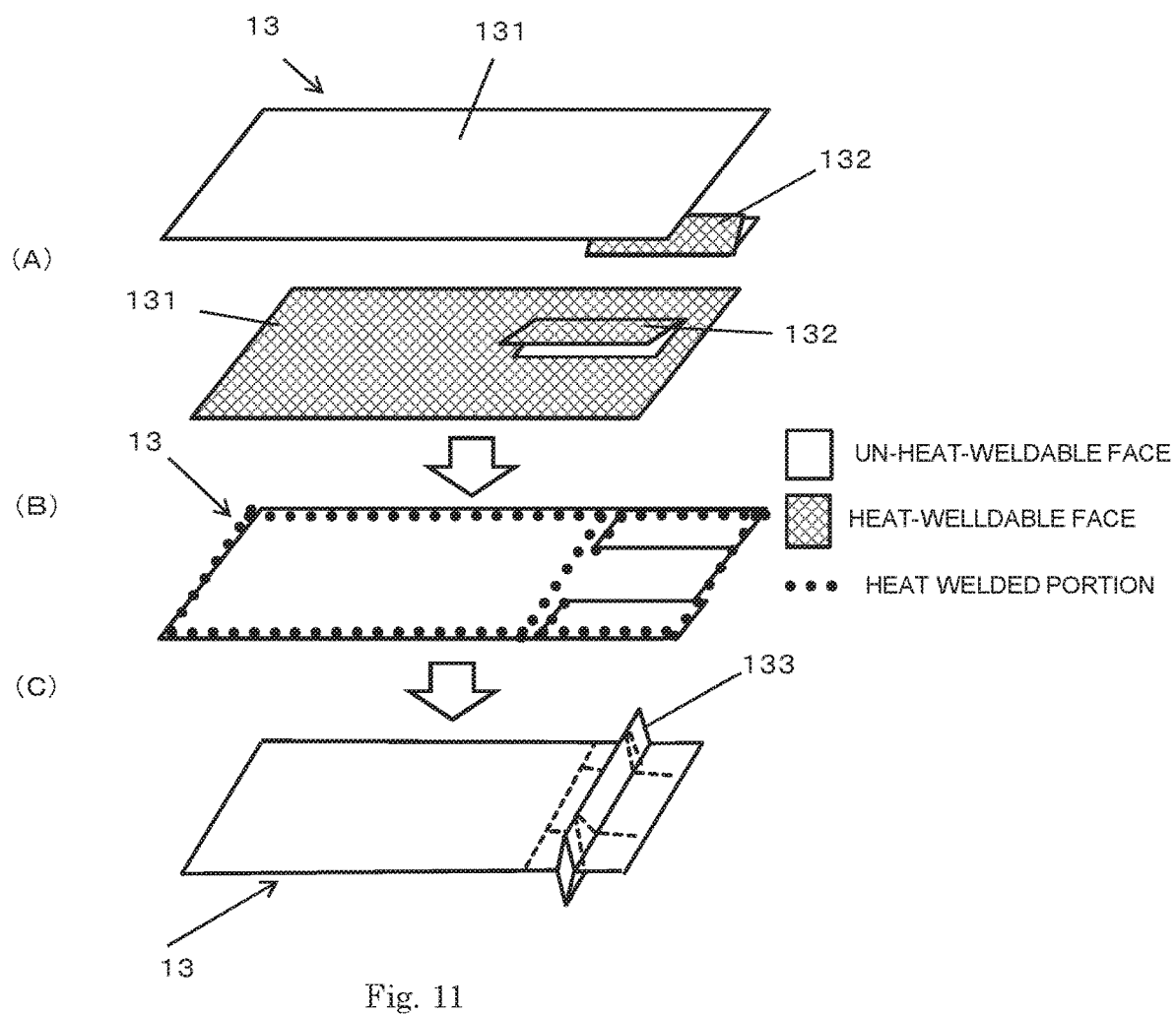
FIG. 11 is a diagram showing a package in which the second chamber can expand in a terminal direction.

(A), (B) and (C) in FIG. 11 illustrate specific examples of the outer package 13 configured such that the second chamber expands in the terminal direction. Hereinafter, the outer package 13 that expands in the direction in which the first terminal and the second terminal are led out will be described with reference to FIG. 11 or the like. In the following description, when referring to the direction of the outer package, the direction perpendicular to the "terminal direction" is referred to as a "width direction."

In the example shown in FIG. 11, the outer package includes, as outer package materials, a pair of main sheets 131 disposed so as to face each other and sandwich a battery element (not shown in FIG. 11) from above and below and a pair of side sheets 132 disposed between the pair of main sheets 131 at positions corresponding to the second chamber. The pair of main sheets 131 and the pair of side sheets 132 are formed such that only one face is weldable, and the pair of main sheets 131 are disposed such that weldable faces face each other. The pair of side sheets 132 are disposed such that they are folded in half with the weldable face facing outward, the folds are placed so as to face each other, and disposed at both ends of the main sheets 131 in the width direction at positions corresponding to the second chamber between the main sheets 131 (see (A) in FIG. 11).

The main sheets 131 and the side sheets 132 disposed as described above are welded at a region along the whole perimeter of the outer edge of the main sheets 131 and a region corresponding to a boundary between the first chamber and the second chamber (see (B) in FIG. 11). With the side sheets 132 disposed, the side sheets 132 constitute side walls of the second chamber. The main sheets 131 in the part of the second chamber are mountain-folded along the width direction of the main sheets 131 so that a mountain portion 133 is formed on the surface side and the back of the outer package 13 (see (C) in FIG. 11). In this way, the length in the terminal direction of the second chamber becomes smaller. By causing a gas to be generated in the second chamber in this condition, it is possible to expand the second chamber in the terminal direction.

Figure 12:
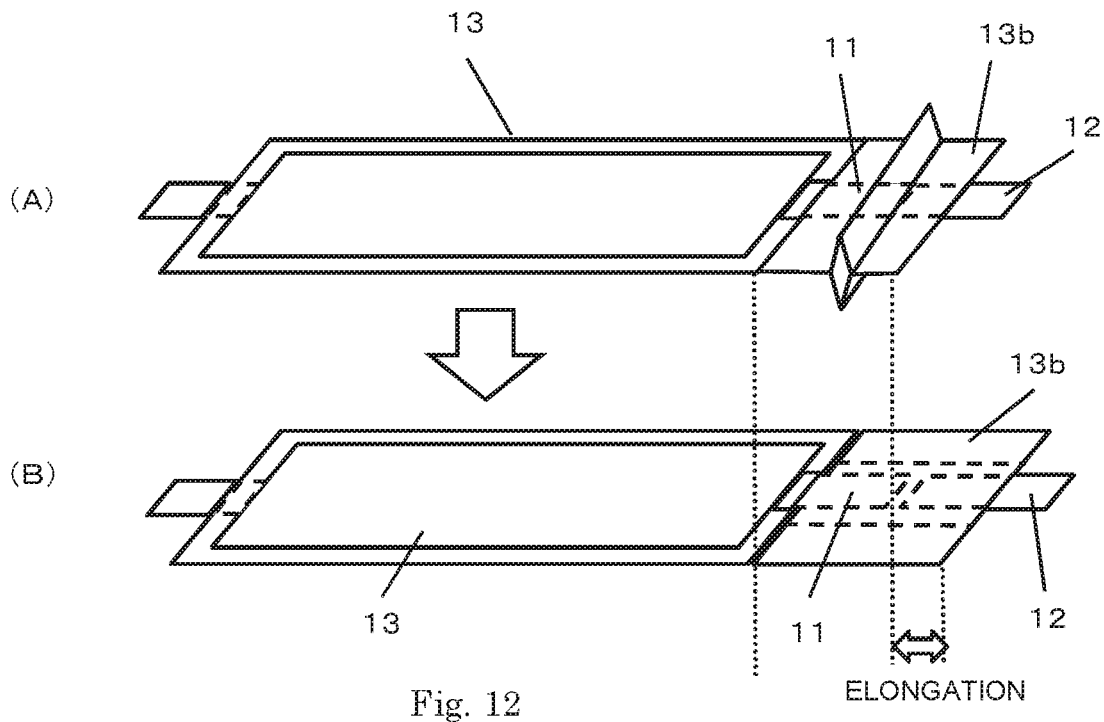
FIG. 12 is a diagram illustrating a current interrupting operation of the battery using the package shown in FIG. 11.

(A) and (B) in FIG. 12 illustrate an example of the battery to which the outer package shown in FIG. 11 is applied. When the outer package shown in FIG. 11 is applied as the outer package of the battery, the second terminal 12 is in contact with the first terminal 11 before the second chamber 13b expands, whereas when the second chamber 13b expands, a positional relationship with the first terminal 11 is determined so that the second terminal 12 separates from the first terminal 11 and the second terminal 12 is fixed to the outer package 13. The aforementioned gas generating material is sealed in the second chamber 13b.

By folding the outer package to enable the second chamber 13b to expand in the terminal direction as in the present embodiment, it is possible to reliably interrupt the electrical connection between the first terminal 11 and the second terminal 12 as the second chamber 13b inflates and the possibility that both terminals will come into contact with each other over again after the interruption is extremely low. As a result, it is possible to further improve the safety of the battery. Furthermore, by folding the second chamber 13b with respect to the first chamber 13a, the expansion direction of the second chamber 13b can be changed optionally. For example, as shown in (A) and (B) in FIG. 13, if the second chamber 13b is folded toward the first chamber 13a, it is possible to reduce the increment of the space occupied of the battery by the expansion of the second chamber 13b. Especially when the folding angle is 90 degrees, the second chamber 13b can be made to expand in the thickness direction of the first chamber 13a. In the actual battery, there are many laminated electrodes and the thickness of the battery element is large, and therefore the first chamber 13a is much thicker than the second chamber 13b. Therefore, if the second chamber 13b is structured so as to expand in the thickness direction of the first chamber 13a, even when the second chamber 13b expands, there is substantially no increase in the space occupied by the battery, and it is possible to provide a safe battery system (battery pack) which can be installed with a minimum installation space.

Figure 13:
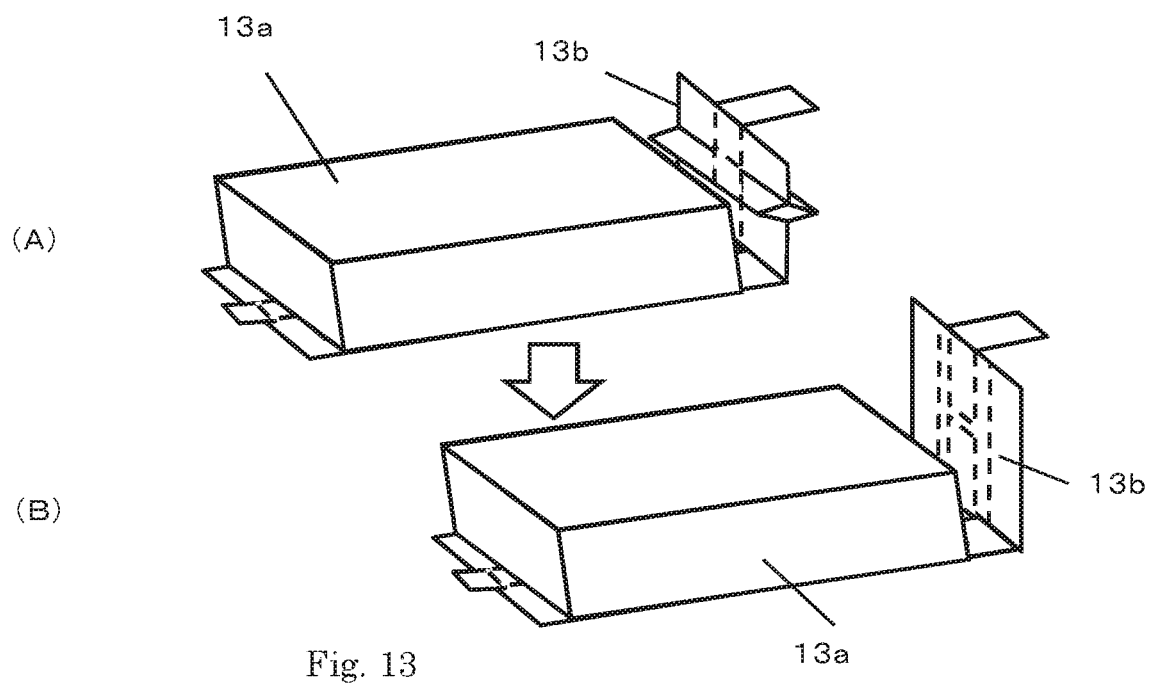
FIG. 13 is a diagram showing a current interrupting operation when the second chamber is folded toward the first chamber in the battery shown in FIG. 12.

FIGS. 11 to 13 have illustrated examples where one mountain portion 133 is formed in the second chamber. However, a bellows structure may also be adopted in which a plurality of mountain portions 133 are arrayed in the terminal direction. By forming the plurality of mountain portions 133 in the second chamber, it is possible to reduce the height of the mountain portion 133 and obtain a large amount of expansion. The ability to reduce the height of the mountain portion 133 corresponds to the ability to reduce the thickness of the second chamber and is therefore preferable. The method of folding the outer package 13 to cause the second chamber to expand in the terminal direction is not limited to the methods shown in FIGS. 11 to 13 either, and for example, by applying the method disclosed in aforementioned Patent Literature 4, it is possible to adopt a structure in which the outer package is folded toward the terminal direction at the part of the second chamber. The number of folding locations may be one or plural in this case, too.

Embodiments have been described above where the second chamber 13b is included only on one first terminal 11 side, but the second chamber 13b may also be provided on the other first terminal 11 side. In this case, if both second chambers 13b are respectively provided with the current interrupting mechanism 15, this means that safety apparatuses are provided on both positive electrode and negative electrode sides, which is more preferable.

Embodiments have been described above where the pair of first terminals 11 are led out from different sides of the battery element 10, but the pair of first terminals 11 may be led out from the same side. In this case, current interrupting mechanisms can be provided on both the positive electrode and negative electrode sides in one second chamber, which is preferable from the viewpoint of safety improvement. Furthermore, since the number of the second chambers can be one, if the second chamber structure that expands in the terminal direction during inflation is adopted, the amount of increase of the space occupied by the battery after the second chamber has expanded can be less than in the case where two second chambers are provided. Thus, it is possible to provide a safe battery system (battery pack) which can be installed in a smaller installation space.

As the gas generating material sealed in the second chamber, a volatile material can be used. When the heat generated in the first chamber transmits through the first terminal, which is a conductor, and the temperature of the second chamber rises, the volatile material placed in the second chamber in advance inflates in the second chamber. The volatile material remains in the second chamber until abnormal heat generation occurs in the battery. For this reason, even when the volatile material affects the battery characteristic of the battery in the first chamber, the volatile material can be used without adversely affecting the battery characteristic.

Examples of a solid volatile material include an adsorbent that has adsorbed a gas. For example, use of silica gel or zeolite that has adsorbed water content allows heat that transmits through a conductor to cause the adsorbent to discharge the gas such as water content and cause the second chamber to inflate. Furthermore, a metal hydrate can also be used as the gas generating material. For example, when heated, aluminum hydroxide discharges water content. In such materials, the water content is shifted to the electrolyte even in the operating temperature area of the battery, with the result that an electrolysis takes place and destroys the lithium ion battery, and therefore these materials cannot be placed in the first chamber. However, since the second chamber is provided apart from the first chamber, and these materials can be placed in the second chamber. Placing these materials in the second chamber allows current to be interrupted when the temperature rises due to the occurrence of abnormality without affecting the characteristic of the battery.

A liquid can also be used as the gas generating material. A gas can be generated if at least one solvent that makes up the liquid is volatized. The current interrupting mechanism is preferably activated for safety at an early stage, that is, at a stage at which the temperature of the battery is sufficiently lower than a thermal runaway temperature of an active material, and for that purpose, the volatilization temperature of the solvent is preferably lower than 200° C. In order to fill the second chamber with the gas, the volatilization temperature of the solvent is preferably equal to or lower than the melting point of the resin used as the sealing layer of the outer package. For example, when polypropylene resin is used as the sealing layer of the outer package, the volatilization temperature of the solvent is equal to or lower than 160° C. which is the melting point of polypropylene resin, preferably 150° C. or lower or more preferably 140° C. or lower. When ethylene resin is used as the sealing layer of the outer package, the volatilization temperature of the solvent is equal to or lower than 120° C. which is the melting point of ethylene resin, preferably 110° C. or lower or more preferably 100° C. or lower.

On the other hand, when stability of the battery is taken into consideration, it is not desirable that the solvent be volatized at a stage at which no abnormality has occurred. Therefore, the volatilization temperature of the solvent is preferably 50° C. or higher, more preferably 70° C. or higher and further preferably 80° C. or higher.

More specifically, water can be used as the solvent. Of water, pure water is particularly preferable. When the first terminals of the positive electrode side and the negative electrode side exist in the second chamber, pure water prevents any gas from being generated as a result of electrolysis.

A nonaqueous solvent, for example, an electrolyte component, which will be described later, may be used as the solvent. Using the electrolyte component, even if the sealing section that separates the first chamber from the second chamber is damaged and the liquid leaks from the second chamber to the first chamber, the first chamber can be kept in a nonaqueous condition. Furthermore, when the liquid in the second chamber has the same composition as that of the electrolyte in the first chamber, even if the liquid in the second chamber leaks into the first chamber, the function of the battery can be maintained.

Examples of such a nonaqueous solvent include diethyl carbonate, dimethyl carbonate, methyl-ethyl carbonate. The gas for causing the current interrupting mechanism to operate is preferably a nonflammable or flame retardant gas, and so a gas containing fluorine or phosphor atoms is preferable. Examples of such a gas include fluorinated esters such as methyl fluoroethyl carbonate, fluorinated carbonates, fluorinated ether such as tetrafluoroethyltetrafluoropropylether, decafluoropropylether, octafluoropentyltetrafluoroethylether or phosphonate esters.

(Outer Package)

The outer package that hermetically seals the battery element can be configured using any given flexible outer package material being stable for electrolyte and having sufficient vapor barrier property. As such an outer package, a laminated film having a welding layer may be preferably used. Examples of the laminated film include polypropylene and polyethylene coated with aluminum, silica, alumina. An aluminum laminated film is particularly preferable from the viewpoint of suppressing volume expansion due to expansion of the film itself.

Examples of a typical layer configuration of the laminated film include a configuration in which a metal thin-film layer and a heat-fusible resin layer are laminated together. Another example of a typical layer configuration of the laminated film is a configuration in which a protective layer made up of a film of polyester such as polyethylene terephthalate or nylon is laminated on the surface opposite to a heat-fusible resin layer of the metal thin-film layer. When the battery element is sealed, the battery element is enclosed by the heat-fusible resin layers placed facing each other. As the metal thin-film layer, a foil of Al, Ti, a Ti alloy, Fe, stainless steel, an Mg alloy or the like having a thickness of for example, 10 to 100 µm is used. The resin used for the heat-fusible resin layer is not particularly limited as long as it is heat-fusible resin. As the heat-fusible resin, for example, polypropylene, polyethylene, acid modified products thereof, polyphenylene sulfide, polyester such as polyethylene terephthalate, polyamide, ethylene-vinyl acetate copolymer, ionomer resin in which ethylene-methacrylic acid copolymer or ethylene-acrylic acid copolymer is intermolecularly bonded by metal ion. The heat-fusible resin layer preferably has a thickness of 10 to 200 µm or more preferably 30 to 100 µm.

(Battery Element)

Next, the configuration of the battery element will be described briefly. Although the configuration of the battery element is not particularly limited, for example, a lamination type configuration which incorporates an electrode element with a positive electrode and a negative electrode arranged so as to face each other, and an electrolyte may be adopted.

Figure 14:
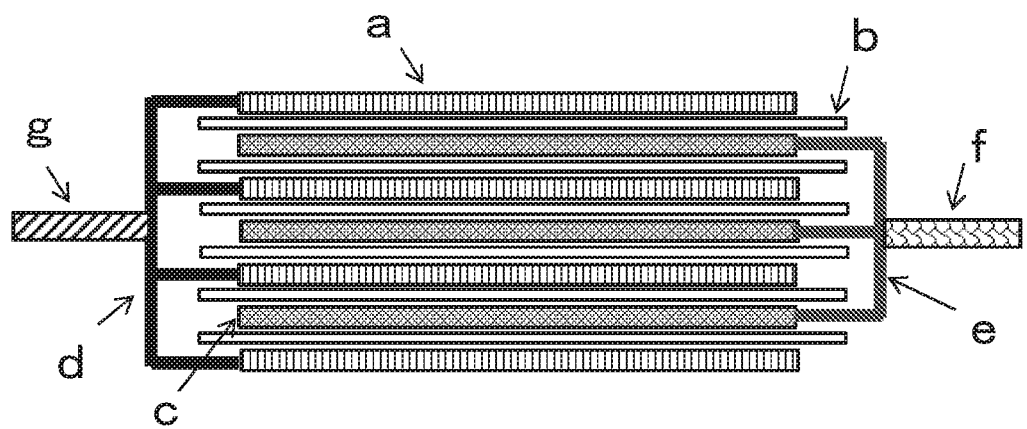
FIG. 14 is a schematic view showing an example of a configuration of a battery element used in the present invention.

FIG. 14 is a schematic cross-sectional view illustrating a structure of an electrode element included in a laminated secondary battery. This electrode element is formed of a plurality of positive electrodes c and a plurality of negative electrodes a having a planar structure with a separator b interposed therebetween, alternately piled one atop another. Positive electrode current collectors e provided for the respective positive electrodes c are welded and electrically connected to each other at an end portion not covered with a positive electrode active material and further, a positive electrode terminal f is welded at the welded location thereof. The positive electrode terminal f may be one of the aforementioned first terminals 11 (see FIG. 1A or the like) or one of the first terminals 11 may be electrically connected to the positive electrode terminal f. Negative electrode current collectors d provided for the respective negative electrodes a are welded and electrically connected to each other at an end portion not covered with a negative electrode active material and further, a negative electrode terminal g is welded at the welded location thereof. The negative electrode terminal g may be the other of the aforementioned first terminals 11 (see FIG. 1A or the like) or the other of the first terminals 11 may be electrically connected to the negative electrode terminal g.

The electrode element having such a planar laminated structure has a large battery surface area, and can thereby efficiently release heat generated in the event of abnormality. In contrast, in the case of a winding type structure, heat generated at the center is accumulated without being released. Since the electrode element having a laminated structure has no portion with a small radius of curvature (region close to a winding core in the winding structure), it has an advantage of being less susceptible to adverse influence on a volume change of the electrode accompanying charge/discharge compared to the electrode element having the winding structure. That is, the electrode element having the laminated structure is effective as the electrode element using an active material which is likely to cause volume inflation. On the other hand, since the electrode element having the winding structure has bent electrodes, when a volume change occurs, the structure is likely to be distorted. When a negative electrode active material such as silicon oxide which has a large volume change accompanying charge/discharge is used, a secondary battery using the electrode element having the winding structure has a large capacity drop accompanying charge/discharge.

Although not particularly limited, the battery element of the present invention is preferably a battery element of a lithium ion secondary battery. Hereinafter, preferable materials for the battery element will be described.

[1] Negative Electrode

The negative electrode is obtained by binding a negative electrode active material to the negative electrode current collector using a negative electrode binder. As the negative electrode active material in the present embodiment, any material can be used as long as it can absorb/desorb lithium unless the effects of the present invention are impaired significantly. Normally, just as in the case of the positive electrode, the negative electrode used is also configured by providing a negative electrode active material layer on the current collector. Note that just as the positive electrode, the negative electrode may also be provided with other layers as appropriate.

The negative electrode active material has no other limitations as long as it is a material capable of absorbing/desorbing lithium ions and any publicly known negative electrode active materials can be used optionally. For example, carbonaceous material such as coke, acetylene black, mesophase microbeads, graphite; lithium metal; lithium alloy such as lithium-silicon, lithium-tin, and lithium titanate may be preferably used. Among them, the negative electrode active material using the carbonaceous material is most preferable in that it has a cyclic characteristic, an excellent safety and an excellent continuous charge characteristic. Note that one kind of negative electrode active material may be used singly or a mixture of two or more kinds of negative electrode active materials may be used in an optional combination and at an optional ratio.

Furthermore, the particle size of the negative electrode active material may be optional as long as it does not significantly impair the effects of the present invention, but it is normally on the order of 1 μm or greater, preferably 15 μm, normally 50 μm or less or preferably 30 μm or less from the viewpoint that it has excellent battery characteristics such as initial efficiency, rate characteristic and cycle characteristic. Furthermore, a carbonaceous material obtained by coating the above-described carbonaceous material with organic matter such as pitch and then sintering the coated carbonaceous material or a carbonaceous material, on a surface of which more amorphous carbon than the carbonaceous material is formed using a CVD method or the like can also be suitably used as the carbonaceous material. Here, examples of the organic matter used for coating include coal tar pitch from soft pitch to hard pitch; carboniferous heavy oil such as dry distillation liquefied oil; straight heavy oil such as atmospheric residue, vacuum residue; petroleum-based heavy oil such as decomposable heavy oil (e.g., ethylene heavy end) produced as byproduct during thermal decomposition of crude oil or naphtha or the like. Theses heavy oils may be distilled at 200 to 400° C. and a solid residue thereby obtained may be crushed into 1 to 100 μm and used. Moreover, vinyl chloride resin, phenol resin, imide resin or the like may also be used.

The negative electrode active material layer can be formed into a sheet electrode, for example, by roll-molding the above-described negative electrode active material or into a pellet electrode through compression molding, but normally as in the case of the positive electrode active material layer, the negative electrode active material layer can be manufactured by applying to the current collector, a coating liquid obtained by slurrying the above-described negative electrode active material, a binder and various kinds of auxiliary agent if necessary using a solvent and drying the coating liquid.

As the negative electrode binder, although not particularly limited, for example, polyvinylidene fluoride, vinylidene fluoride-hexafluoropropylene copolymer, vinylidene fluoride-tetrafluoroethylene copolymer, styrene-butadiene copolymerized rubber, polytetrafluoroethylene, polypropylene, polyethylene, polyimide, polyamide imide may be used. The amount of the negative electrode binder used is preferably 1 to 25 parts by mass with respect to 100 parts by mass of the negative electrode active material from the viewpoint of a trade-off relationship between "sufficient binding force" and "high energization."

[2] Current Collector

As the material for the negative electrode current collector, a publicly known current collector may be used optionally, and, for example, a metallic material such as copper, nickel, SUS may be used. Among them, copper is particularly preferable from the viewpoint of ease of work and cost. The negative electrode current collector may be preferably subjected to roughening treatment in advance. The shape of the current collector is also optional and examples of the shape include foil shape, planar shape, mesh shape. A perforated current collector such as expand metal or punching metal may also be used.

As a method for manufacturing the negative electrode, for example, a negative electrode active material layer including a negative electrode active material and a negative electrode binder may be formed on the negative electrode current collector to manufacture the negative electrode. Examples of the method for manufacturing the negative electrode active material layer include a doctor blade method, a die coater method, a CVD method, a sputtering method. After forming the negative electrode active material layer in advance, a thin film of aluminum, nickel or an alloy thereof may be formed using a method such as vapor deposition, sputtering and used as the negative electrode current collector.

[3] Positive Electrode

The positive electrode active material in the present embodiment is not particularly limited if it is a material capable of absorbing/desorbing lithium and can be selected from several viewpoints. From the viewpoint of a high energy density, high-capacity compound may be preferably contained. Examples of the high-capacity compound include lithium-nickel composite oxide in which lithium nickelate ($LiNiO_2$) or part of Ni of lithium nickelate substituted by another metal element, and a layered lithium-nickel composite oxide represented by the following formula (A) are preferred.

$$Li_yNi_{(1-x)}M_xO_2 \qquad (A)$$

(where, $0 \le x < 1$, $0 < y \le 1.2$, M is at least one kind of element selected from a group composed of Co, Al, Mn, Fe, Ti and B).

From the viewpoint of high capacity, the content of Ni is preferably high, that is, in formula (A), x is preferably 0.5 or less, more preferably 0.4 or less. Examples of such a compound include $Li_\alpha Ni_\beta Co_\gamma Mn_\delta O_2$ ($0 < \alpha \le 1.2$, preferably $1 \le \alpha \le 1.2$, $\beta+\gamma+\delta=1$, $\beta \ge 0.7$, $\gamma \le 0.2$), $Li_\alpha Ni_\beta Co_\gamma Al_\delta O_2$ ($0 < \alpha \le 1.2$, preferably $1 \le \alpha \le 1.2$, $\beta+\gamma+\delta=1$, $\beta \ge 0.6$, preferably $\beta \ge 0.7$, $\gamma \le 0.2$) and particularly $LiNi_\beta Co_\gamma Mn_\delta O_2$ ($0.75 \le \beta \le 0.85$, $0.05 \le \gamma \le 0.15$, $0.10 \le \delta \le 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, $LiNi_{0.8}Co_{0.1}Al_{0.1}O_2$ can be preferably used.

On the other hand, from the viewpoint of thermal stability, the content of Ni preferably does not exceed 0.5, that is, x is preferably 0.5 or greater in formula (A). Moreover, no specific transition metal preferably exceeds half of proportion. Examples of such a compound include $Li_\alpha Ni_\beta Co_\gamma Mn_\delta O_2$ ($0 < \alpha \le 1.2$, preferably $1 \le \alpha \le 1.2$, $\beta+\gamma+\delta=1$, $0.2 \le \beta \le 0.5$, $0.1 \le \gamma \le 0.4$, $0.1 \le \delta \le 0.4$). More specifically, examples include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), $LiNi_{0.5}Co_{0.3}Mn_{0.2}O_2$ (abbreviated as NCM532) (however, also including compounds in which the contents of the respective transition metals have fluctuated by the order of 10%).

A mixture of two or more kinds of the compounds expressed in formula (A) may be used and, for example, NCM532 or NCM523 may also be preferably used in a mixture with NCM433 at a ratio ranging from 9:1 to 1:9 (typical example is 2:1). Furthermore, in formula (A), by mixing a material having a high Ni content (x is 0.4 or less) and a material having a Ni content not exceeding 0.5 (x is 0.5 or greater, for example, NCM433), it is also possible to constitute a battery having a high capacity and excellent thermal stability.

In addition to the above-described materials, examples of the positive electrode active material include lithium manganate having a layered structure or a spinel structure such as $LiMnO_2$, $Li_xMn_2O_4$ ($0 < x < 2$), $Li_2MnO_3$, $Li_xMn_{1.5}Ni_{0.5}O_4$ ($0 < x < 2$); $LiCoO_2$ or part of these transition metals substituted by another metal; these lithium transition metal oxides whose Li is caused to exceed the stoichiometric composition; and a material having an olivine structure such as $LiFePO_4$. Furthermore, a material obtained by substituting some of these metal oxides by Al, Fe, P, Ti, Si, Pb, Sn, In, Bi, Ag, Ba, Ca, Hg, Pd, Pt, Te, Zn, La or the like may also be used. One kind of the above-described positive electrode active materials may be used singly or two or more kinds thereof may be used in combination.

As the positive electrode binder, a material similar to that for the negative electrode binder may be used. Among them, polyvinylidene fluoride is preferable from the viewpoint of general-purposeness and low cost. The amount of the positive electrode binder used is preferably 2 to 10 parts by mass with respect to 100 parts by mass of the positive electrode active material from the viewpoint of a trade-off relationship between a "sufficient binding force" and a "high energization."

As the positive electrode current collector, a material similar to that for the negative electrode current collector may be used.

A conductive auxiliary member may be added to the positive electrode active material layer containing the positive electrode active material for the purpose of reducing impedance. Examples of the conductive auxiliary member include carbonaceous minute particles such as graphite, carbon black, acetylene black.

[4] Electrolyte

The electrolyte includes a nonaqueous electrolyte which is stable at an operating potential of the battery. Specific examples of the nonaqueous electrolyte include cyclic carbonates such as propylene carbonate (PC), ethylene carbonate (EC), fluoroethylene carbonate (FEC), t-difluoroethylene carbonate (t-DFEC), butylene carbonate (BC), vinylene carbonate (VC), vinylethylene carbonate (VEC); chain carbonates such as allylmethyl carbonate (AMC), dimethyl carbonate (DMC), diethyl carbonate (DEC), ethylmethyl carbonate (EMC), dipropyl carbonate (DPC); propylene carbonate derivative; aliphatic carboxylic acid esters such as methyl formate, methyl acetate, ethyl propionate; nonprotic organic solvent such as cyclic esters such as γ-butyrolactone (GBL). The nonaqueous electrolyte may be used singly or a mixture of two or more kinds may be used in combination. Furthermore, sulfur-containing cyclic compound such as sulfolane, fluorinated sulfolane, propane sultone or propene sultone may be used.

Specific examples of support salt contained in the electrolyte include, but are not particularly limited to, lithium salt such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$. The support salt may be used singly or two or more kinds thereof may be used in combination.

[5] Separator

As the separator, although not particularly limited, porous film or non-woven fabric made of such as polypropylene, polyethylene, fluorine-based resin, polyamide, polyimide, polyester, polyphenylene sulfide, as well as an article in which inorganic substance such as silica, alumina, glass is joined to a base material made of the above material and an article singly processed from the above material as non-woven fabric cloth or cloth may be used. Furthermore, these materials may be laminated to be used as the separator.

The battery element of the present invention is not limited to the battery element of the above-described lithium ion secondary battery, but the present invention is also applicable to any battery. However, in many cases, heat dissipation is also the problem of higher capacity batteries, and so the present invention is preferably applied to higher capacity batteries, and higher capacity lithium ion secondary batteries in particular.

As described above, the battery 1 according to an embodiment of the present invention includes the battery element 10, the pair of first terminals 11 electrically connected to the battery element 10, the outer package 13 made of a flexible outer package material and partitioned into the first chamber 13a that seals the battery element 10 and the one or two second chambers 13b adjacent to the first chamber 13a, and the one or two second terminals 12 led out to the outside of the outer package 13 from the second chamber 13b so that at least one of the pair of first terminals 11 is made electrically connectable to an external wiring via the second chamber 13b, in which the gas generating material 14 that generates a gas at a predetermined temperature or higher is sealed in the second chamber 13b.

In the above-described battery 1, the first terminal 11 and the second terminal 12 are preferably arranged so that inflation of the second chamber 13b may cause an interruption of the electrical connection.

The battery 1 according to another embodiment of the present invention includes the battery element 10, the pair of first terminals 11 electrically connected to the battery element 10, and the outer package 13 made of a flexible outer package material, in which the outer package 13 is partitioned into the first chamber 13a that seals the battery element 10 and the one or two second chambers 13b adjacent to the first chamber 13a, at least one of the pair of first terminals 11 is made electrically connectable to an external wiring via the second chamber 13b, and the second chamber 13b includes the current interrupting mechanism 15 configured to generate a gas when the temperature of the battery element 10 rises to a predetermined temperature or higher, cause the second chamber 13b to inflate with the generated gas and interrupt an electrical connection between the battery element 10 and the external wiring.

Here, the current interrupting mechanism 15 can include the first terminal 11 that extends into the second chamber 13b, the second terminal 12, one end side of which is led out to an outside of the outer package 13 in contact with the first terminal 11 within the second chamber 13b and that is fixed to the outer package 13 so as to separate from the first terminal 11 when the second chamber 13b inflates, and the gas generating material 14 that is sealed in the second chamber 13b and generates a gas at a predetermined temperature or higher.

Hereinafter, an embodiment of a method for manufacturing the battery of the present invention will be described.

According to the embodiment of the method for manufacturing the battery, a battery element assembly is provided first in which the pair of first terminals 11 are electrically connected to the battery element 10. Next, the outer package 13 is formed of a flexible outer package material. In this step, the outer package 13 is partitioned into the first chamber 13a that seals the battery element 10 and the one or two second chambers 13b adjacent to the first chamber 13a, and the one or two second terminals 12 is/are led out to the outside of the outer package 13 from the second chamber 13b so that at least one of the pair of first terminals 11 is made electrically connectable to the external wiring via the second chamber 13b, and the gas generating material 14 that generates a gas at a predetermined temperature or higher is sealed in the second chamber 13b and it is thereby possible to form the outer package 13.

In the above-described manufacturing method, the step of forming the outer package 13 can include arranging the first terminal 11 and the second terminal 12 so that the electrical connection is interrupted when the second chamber 13b inflates. In this case, the step of forming the outer package 13 may be such that the second chamber 13b inflates in the terminal direction which is the direction in which the second terminal 12 is led out or the outer package 13 may be formed so that the second chamber 13b inflates in the thickness direction thereof. When the second chamber 13b is formed so as to inflate in the thickness direction thereof, the step of forming the outer package 13 can favorably interrupt current when the second chamber 13b inflates by bonding the first terminal 11 to one of the surfaces facing each other of the outer package and bonding the second terminal 12 to the other surface.

The step of forming the outer package 13 can include temporarily fixing the first terminal 11 and the second terminal 12 while keeping the first terminal 11 and the second terminal 12 in contact with each other. In this case, the first terminal 11 and the second terminal 12 can be temporarily fixed by sandwiching an overlapping part of the first terminal 11 and the second terminal 12 using the clip 20, using the snap 30 including the male connector 31 and the female connector 32 engaging with each other, fixing the male connector 31 to one of the first terminal 11 and the second terminal 12 and fixing the female connector 32 to the other or coating with thermoplastic resin, the portions of the first terminal 11 and the second terminal 12 in contact with each other from outside.

Figure 15:
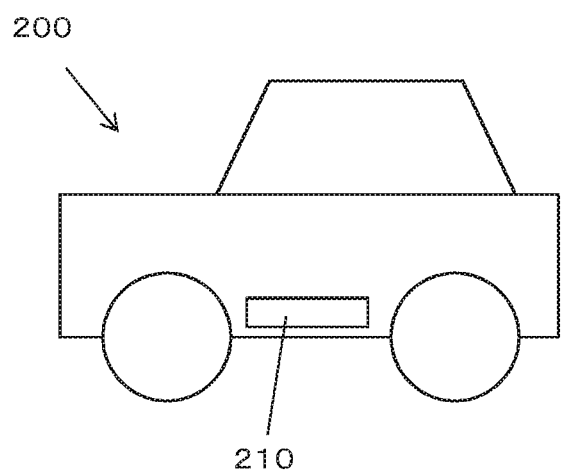
FIG. 15 is a schematic view illustrating an example of an electric automobile provided with the battery of the present invention.
Figure 16:
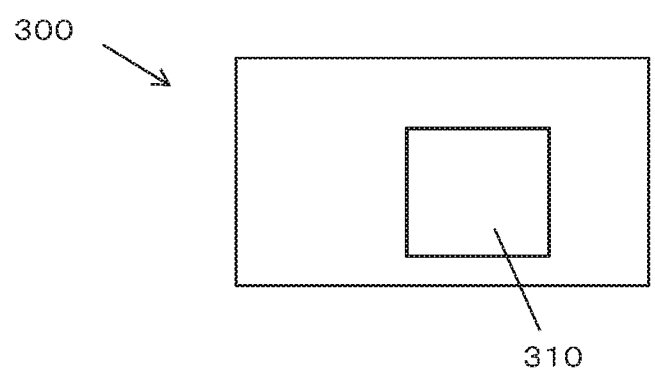
FIG. 16 is a schematic view illustrating an example of an electric storage facility provided with the battery of the present invention.

The battery according to the present invention can be used for various devices and electric storage facilities or the like. Some of such examples include an electric car which is an electric vehicle as shown in FIG. 15 and an electric storage facility 300 as shown in FIG. 16. The electric car 200 and the electric storage facility 300 are provided with battery packs 210 and 310 respectively. The battery packs 210 and 310 are configured to connect a plurality of batteries in series and parallel so as to satisfy required capacities and voltages. Any one of the batteries of the aforementioned embodiments may be used as the plurality of batteries provided for the battery packs 210 and 310.

INDUSTRIAL APPLICABILITY

The battery according to the present invention can be used for all industrial fields requiring power sources and industrial fields related to transportation, storage and supply of electrical energy. More specifically, the battery according to the present invention can be used for power sources for mobile devices such as cellular phone, notebook personal computer; power sources for electric vehicles including electric car, hybrid car, electric motorcycle, power assist bicycle, and transfer/transportation media of trains, satellites and submarines; backup power sources for UPS or the like; electric storage facilities for storing electric power generated by photovoltaic power generation, wind power generation or the like.

REFERENCE SIGNS LIST 1 battery
10 battery element
11 first terminal
12 second terminal
13 outer package
13a first chamber
13b second chamber
14 gas generating material
15 current interrupting mechanism
20 clip
30 snap
31 male connector
32 female connector
111 concave section
121 convex section
131 main sheet 132 side sheet
133 mountain portion

The invention claimed is:

1. A method for manufacturing a battery, comprising:
a step of providing a battery element assembly in which a pair of first terminals are electrically connected to a battery element; and
a step of forming an outer package using a flexible outer package material by partitioning the outer package into a first chamber that seals the battery element and one or two second chambers adjacent to the first chamber, leading out one or two second terminals from the second chamber to an outside of the outer package so that at least one of the pair of first terminals is made connectable to an external wiring via the second chamber, and sealing the second chamber with a gas generating material that generates a gas in the second chamber to expand the second chamber at a predetermined temperature or higher, and
wherein the gas generating material is a metal hydrate or a liquid material containing water.

2. The method for manufacturing a battery according to claim 1, wherein the step of forming the outer package comprises disposing one terminal of the pair of the first terminals and one terminal of the second terminals so that an electrical connection is interrupted by inflation of the second chamber.

3. The method for manufacturing a battery according to claim 2, wherein the step of forming the outer package comprises forming the second chamber so as to inflate to thereby expand in a terminal direction which is a direction in which one terminal of the second terminals is led out.

4. The method for manufacturing a battery according to claim 2, wherein the step of forming the outer package comprises forming the second chamber so as to inflate in a thickness direction of the second chamber.

5. The method for manufacturing a battery according to claim 4, wherein the step of forming the outer package comprises bonding one terminal of the pair of the first terminals to a first side in the second chamber of the outer package and bonding one terminal of the second terminals to a second side in the second chamber, wherein the first side and the second side face each other.

6. The method for manufacturing a battery according to claim 1, wherein the step of forming the outer package comprises temporarily fixing one terminal of the pair of the first terminals and one terminal of the second terminals in contact with each other.

7. The method for manufacturing a battery according to claim 6, wherein the temporary fixing comprises coating a portion where the one terminal of the pair of the first terminals and one terminal of the second terminals are in contact with each other with thermoplastic resin.

8. The method for manufacturing a battery according to claim 1, wherein the gas generating material is the liquid material containing water.

9. The method for manufacturing a battery according to claim 1, wherein the outer package is a laminate film.

10. A battery comprising:
a battery element;
a pair of first terminals electrically connected to the battery element;
an outer package made of a flexible outer package material and partitioned into a first chamber to seal the battery element and one or two second chambers adjacent to the first chamber; and
one or two second terminals led out from the second chamber to an outside of the outer package so that at least one of the pair of first terminals is made electrically connectable to an external wiring via the second chamber,
wherein a gas generating material that generates a gas in the second chamber to expand the second chamber at a predetermined temperature or higher is sealed in the second chamber and
the gas generating material has a metal hydrate or a liquid material containing water.

11. The battery according to claim 10, wherein one terminal of the pair of the first terminals and one terminal of the second terminals, which are connected to each other in the second chamber, are arranged so that the electrical connection is interrupted when the second chamber expands.

12. The battery according to claim 11, wherein the second chamber is configured to expand in a terminal direction which is a direction in which one terminal of the second terminals is led out when the second chamber inflates.

13. The battery according to claim 11, wherein the second chamber is configured so as to inflate in a thickness direction of the second chamber.

14. The battery according to claim 13, wherein in the second chamber, one terminal of the pair of the first terminals is bonded to a first inner surface of the outer package material, one terminal of the second terminals is bonded to a second inner surface of the outer package material, and the first inner surface and the second inner surface face each other.

15. The battery according to claim 11, wherein one terminal of the pair of the first terminals and one terminal of the second terminals are temporarily fixed in contact with each other.

16. The battery according to claim 15, wherein the portion where one terminal of the pair of the first terminals and one of the second terminals are in contact with each other is coated with thermoplastic resin, and the one terminal of the pair of the first terminals and the one of the second terminals are thereby temporarily fixed.

17. The battery according to claim 10, wherein the gas generating material is the liquid material containing water.

18. The battery according to claim 10, wherein the outer package is a laminate film.

* * * * *